C. L. MICHOD.
SUPPORTING RACK.
APPLICATION FILED AUG. 24, 1917.
1,276,556.
Patented Aug. 20, 1918.
3 SHEETS—SHEET 3.
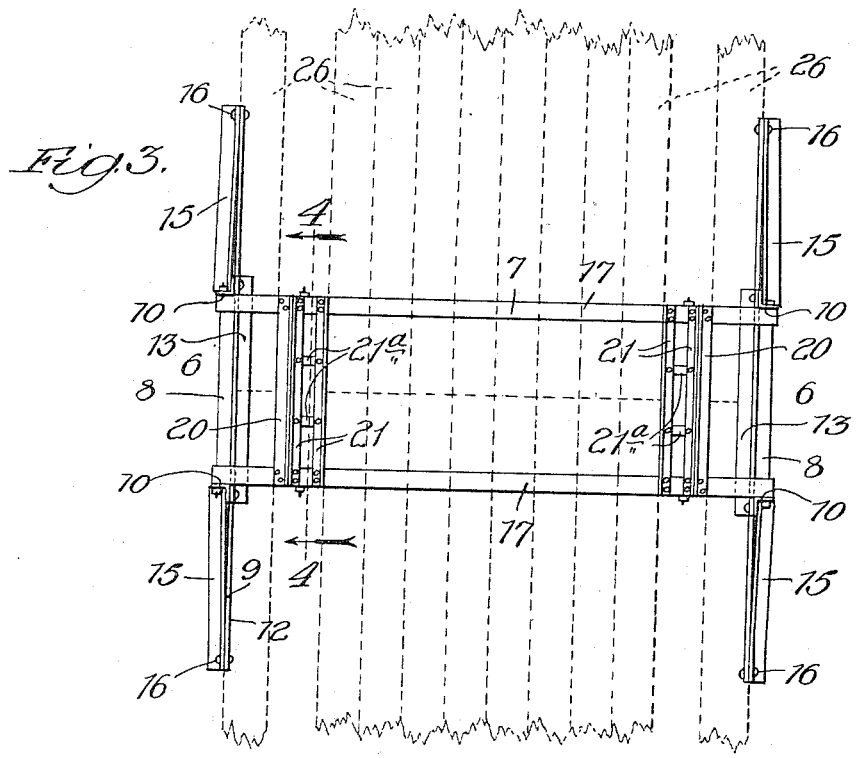
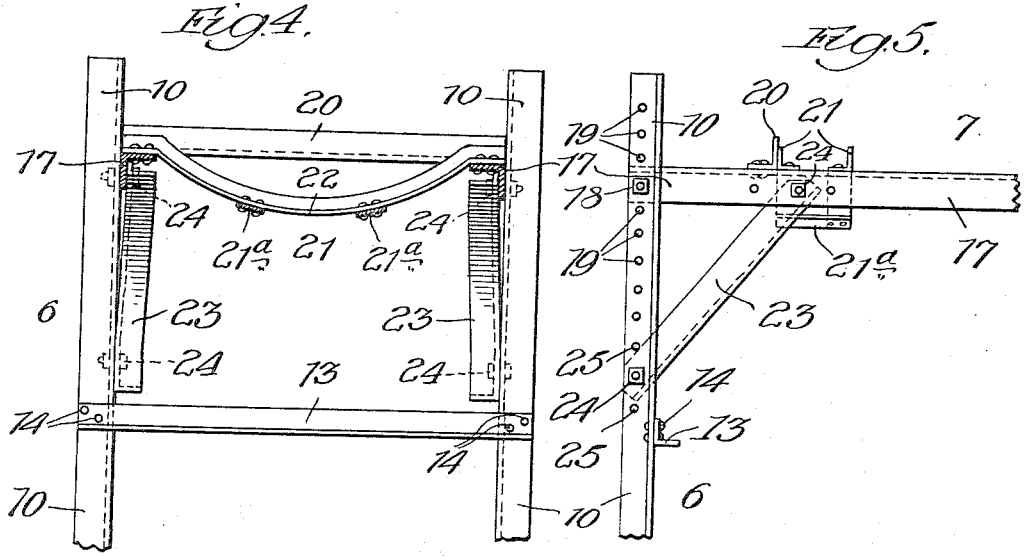

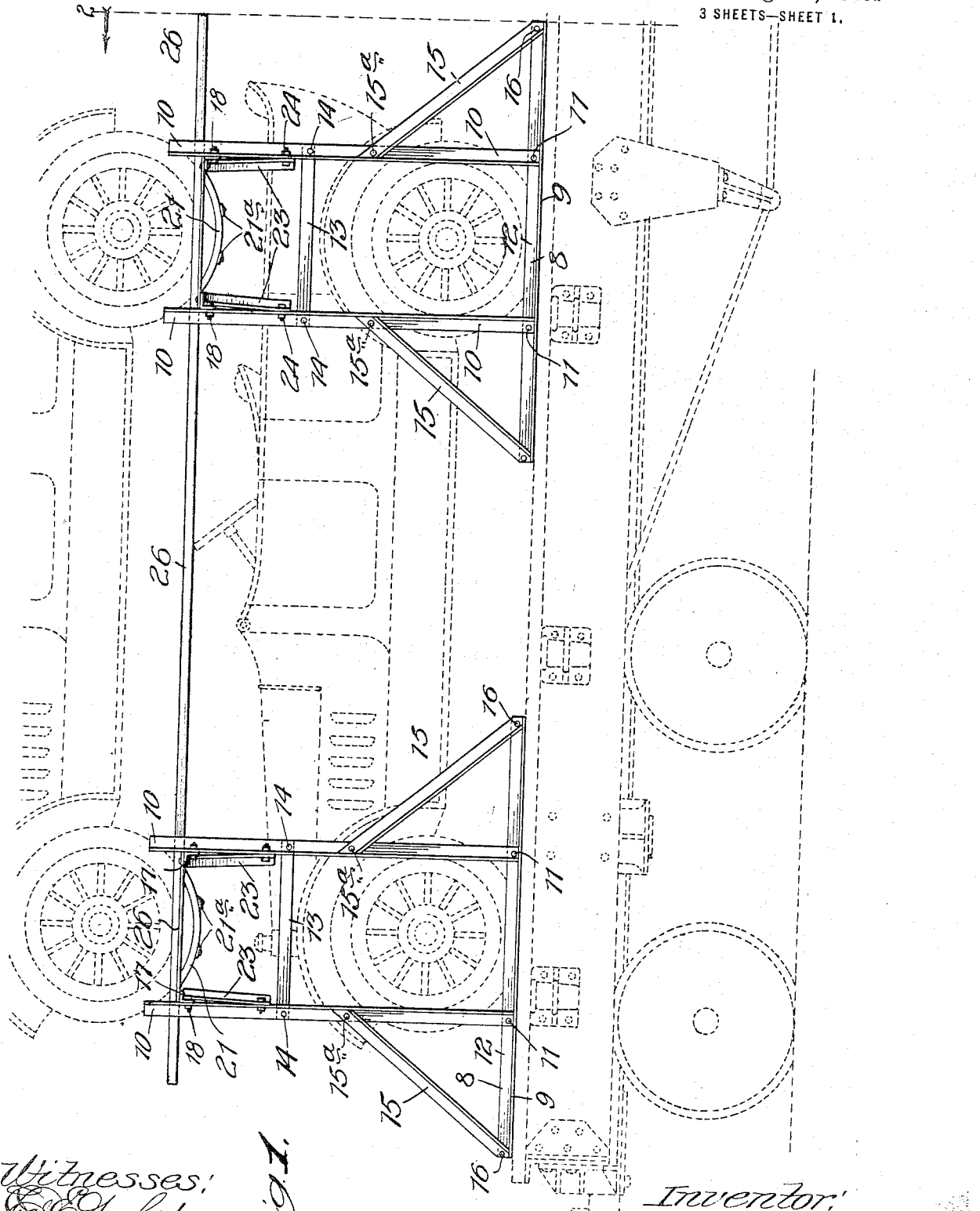

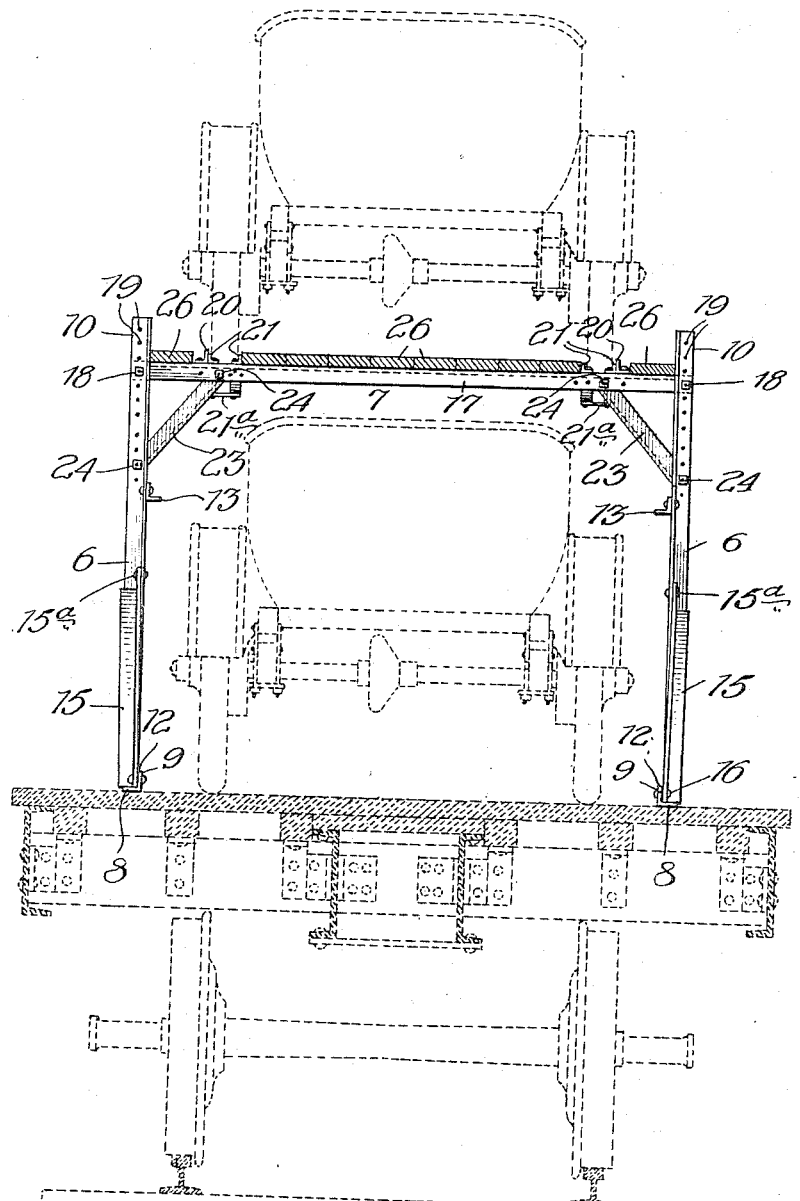

UNITED STATES PATENT OFFICE.

CHARLES L. MICHOD, OF CHICAGO, ILLINOIS.

SUPPORTING-RACK.

1,276,556.   Specification of Letters Patent.   Patented Aug. 20, 1918.

Application filed August 24, 1917. Serial No. 187,984.

*To all whom it may concern:*

Be it known that I, CHARLES L. MICHOD, a citizen of the United States, residing at Chicago, in the county of Cook and State of Illinois, have invented a new and useful Improvement in Supporting-Racks, of which the following is a specification.

My invention relates, more particularly, to racks to be used for storage and shipping purposes, as, for example, in freight cars, flat cars, boats, or warehouses, for supporting in a tier above that which rests upon the floor, a second tier of merchandise, particularly where it is of a character which does not permit either of the superposing of one of the articles on another, or the piling of the articles to the desired height, as, for example, the height sufficient to fill a car.

My invention was devised primarily for use in connection with the storing and transportation of automobiles, the storing of which in superposed position in a freight car greatly economizes in the cost of transportation and in the capacity of the car on which the automobiles are transported, though my invention is applicable, as will be readily understood, to the storing of automobiles, or the like, in warehouses, and the storing of other merchandise in warehouses and its transportation in cars and boats.

My object, generally stated, is to provide improvements in the apparatus heretofore devised for this general purpose, to the end that it will be better adapted to use, and present such practical characteristics that it will satisfy the requirements of a practical construction for this purpose; and other, specific, objects are to provide an apparatus of this character which shall be simple of construction, relatively inexpensive to manufacture, be readily adjustable to different conditions, reduce to the minimum the danger of injuring the floors upon which they are supported, present a rigid, firm structure which will adequately support the load to be carried thereby; and be adapted to use in storing automobiles and other kinds of articles, including merchandise in general.

Referring to the accompanying drawings—

Figure 1 shows by a view in side elevation, and by dotted representation, one end of a freight car with two automobiles located thereon, one above the other, the uppermost automobile being supported from a rack structure shown in full lines and constructed in accordance with my invention.

Fig. 2 is a section taken at the line 2 on Fig. 1 and viewed in the direction of the arrow.

Fig. 3 is a plan view of one of the similar rack structures employed.

Fig. 4 is an enlarged section taken at the line 4—4 on Fig. 3 and viewed in the direction of the arrow; and Fig. 5 is an enlarged view in elevation of the upper left-hand corner of the rack shown in Fig. 2.

According to the preferred illustrated embodiment of my invention each rack comprises two side frames 6 and a cross-frame 7, the latter being preferably constructed of bars of angle shape in cross-section. Each side frame is formed of a base member 8 adapted to rest at its flange 9 upon the bottom of the car, uprights 10, spaced apart, preferably in parallel relation and secured, as by rivets 11, to the vertical flange 12 of the bar 8, a cross piece 13 secured flatwise against one of the angles of the members 10 as by the rivets 14, inclined brace members 15 secured at their lower ends, as by rivets 16, to the extremities of the flanges 12 of the bar 8 and at their upper ends, as by the rivets 15ª to the uprights 10. The cross frame member 7 is formed of the angle bars 17, which extend at their ends between the uprights 10, as shown, and to which they are secured as by the bolts 18 which connect with the uprights at the apertures 19 therein, there being a number of these apertures provided in a vertical plane to permit of the securing of the frame 7 to the uprights 10 at any one of a number of different vertical elevations. The frame member 7 also comprises cross members 20 connected together at intervals by cross-pieces 21ª and secured at their opposite ends to angle-irons 21. Adjacent each one of these cross members 20, and preferably parallel therewith, is a pair of these angle-irons 21 secured at opposite ends to the bars 17, the members of each pair of these angle-irons 21, located at opposite ends of the frame 7, being spaced apart, and deflected, as represented at 22, to afford the arc-shaped structures presented which form troughs at opposite ends of the frame 7, these pairs of bars 21 being spaced apart a distance equal to substantially the width of the running gear, so that the wheels of an automobile supported on the rack will rest within these troughs. The frame members 6 and cross-frame 7 are braced, as through the medium of brace bars 23 bolted at their upper ends, as indicated at 24, to the bars 17, and at their lower ends to the uprights 10 as through the medium of bolts 24 which engage the uprights 10 at openings 25 therein, there being a plurality of these openings provided in a vertical plane to permit of the vertical adjustment of the frame 7.

In the installing of the rack-support, as, for example, for use in the transportation of automobiles, four of the end frames 6 would be set on the floor of the car, generally as shown in the drawings, to present a substantially rectangular arrangement, with the members 8 extending parallel with the sides of the car. The opposed frames 6 would then be connected together through the medium of the frame members 17 and preferably troughs (not shown) would be laid lengthwise of the car and at opposite sides of the racks from one frame 17 to the other and in line with the troughs formed by the bars 21, with an inclined way leading up to these troughs to enable the automobile to be carried to be run upon the rack to a position in which its wheels extend into the troughs provided by the angle-irons 21, in which position of the rack the latter would straddle the automobile beneath it as shown.

If desired, a flooring may be laid on and across the frame-members 7 to form a false flooring which is particularly desirable where boxes, crates and other various forms of merchandise are to be supported on the rack, this flooring in the particular construction shown being formed of the planks 26.

It will be noted from the foregoing that the foundation provided by the lower ends of the members 6 are relatively broad and extend transversely of the flooring of the car; that the frames 17 may be readily adjusted in a vertical plane; that the spaced up-rights 10 in conjunction with the frame 6 provide a very substantial and rigid framework; and that the provision of the framework 7, by employing the members 17, spaced apart, permits the flooring 26 to be firmly held in place on the racks, inasmuch as the boards forming this flooring, instead of crossing over a single bar, as in the case of an ordinary horse, will lie upon and overlap the double bars provided by extending across them from opposite sides.

While I have illustrated and described a particular construction embodying my invention, I do not wish to be understood as intending to limit it thereto, as the same may be variously modified and altered without departing from the spirit of my invention.

What I claim as new and desire to secure by Letters Patent is—

1. The art of storing automobiles which consists in providing beneath the front and rear portions of an automobile to be stored, an automobile-supporting structure formed of elements spaced apart longitudinally of the automobile and supported wholly from the floor of the storage space and to provide an unobstructed space below the automobile supported in elevated position, for housing another automobile to be stored.

2. The art of storing automobiles which consists in providing beneath the front and rear portions of an automobile to be stored, automobile-supporting rack structures spaced apart longitudinally of the automobile and supported wholly from the floor of the storage space, with the one rack structure braced relative to the other thereof to avoid tipping of the rack-structures, and providing an unobstructed space below the automobile supported in elevated position, for housing another automobile to be stored.

3. A rack for the purpose set forth comprising a pair of spaced end frames, a third frame extending crosswise of said end frames and connecting them together, said third frame being formed of members spaced apart extending crosswise of said end frames and in substantially the same horizontal plane, and cross members connected with the said members of said third frame.

4. A rack for the purpose set forth comprising a pair of spaced end frames, a third frame extending crosswise of said end frames and connecting them together, said third frame being adjustable vertically on said end frames and being formed of members spaced apart extending crosswise of said end frames and in substantially the same horizontal plane, and cross members connected with the said members of said third frame.

5. A rack for the purpose set forth comprising a pair of end frames spaced apart, and means connecting said end frames together, said end frames each being formed with a member extending across the lower end thereof and beyond the end frame to form a base presenting a relatively long and narrow surface at which it rests upon the floor.

6. A rack for the purpose set forth comprising a pair of end frames spaced apart, and a third frame extending crosswise of said end frames and connecting them together, said end frames being formed with upwardly-extending bars spaced apart and connected together at their lower ends by substantially horizontal cross members which extend beyond said end frames and at which said end frames are adapted to be supported.

7. A rack for the purpose set forth, comprising a pair of spaced end frames and a third frame extending crosswise of said end frames and connecting them together, said end frames being formed with upwardly-extending members, spaced apart with means connecting them together, and said third frame being formed of members extending lengthwise thereof in substantially the same horizonal plane and connected with said upwardly-extending members.

8. A rack for the purpose set forth comprising a pair of spaced end frames, a third frame extending crosswise of said end frames, and connecting them together, said end frames being formed with upwardly-extending members spaced apart and connected together at their lower ends by substantially horizontal members extending laterally beyond said end frames and at which the latter are adapted to be supported, brace members connected with said upwardly-extending members and said horizontal members, said third frame being formed of members extending lengthwise thereof in substantially the same horizontal plane and secured at their end portions to said upwardly-extending members, and cross members connecting said last-referred-to members together.

9. A rack for the purpose set forth comprising a pair of spaced end frames, and a third frame extending crosswise of said end frames and connecting them together, said third frame being formed of members spaced apart and extending lengthwise of said third frame and cross members connected with said last-referred-to members, said third frame containing in its upper surface troughs for receiving wheels of an automobile.

10. A rack for the purpose set forth, comprising a pair of spaced end frames, a cross-frame connecting said end frames together, said end frames being formed with upwardly-extending members connected together at their lower ends by substantially horizontal members at which said end frames are adapted to be supported, brace-members connected with said last-named members and with said upwardly-extending members, said cross-frame being formed of members extending lengthwise thereof in substantially the same horizontal plane and secured at their end portions to said upwardly-extending members, and cross-bars connecting said last-referred-to members together.

11. A rack for the purpose set forth, comprising a pair of spaced end frames and a cross-frame connecting said end frames together, said cross-frame containing in its upper surface troughs for receiving wheels of an automobile, said cross-frame being formed with members, spaced apart, and deflected intermediate their ends to form troughs, and cross-bars located adjacent each end of the rack at opposite sides of the pairs of said members.

CHARLES L. MICHOD.